US012423164B2

(12) United States Patent
Gan et al.

(10) Patent No.: US 12,423,164 B2
(45) Date of Patent: Sep. 23, 2025

(54) ADAPTIVE API CALL SEQUENCE DETECTION

(71) Applicant: Verizon Patent and Licensing Inc., Basking Ridge, NJ (US)

(72) Inventors: Seng Gan, Ashburn, VA (US); John S McCormick, Cary, NC (US); Raghavendra Jayaram, Bangalore (IN); Alex Redmon, III, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 462 days.

(21) Appl. No.: 18/088,855

(22) Filed: Dec. 27, 2022

(65) Prior Publication Data
US 2024/0211324 A1  Jun. 27, 2024

(51) Int. Cl.
*G06F 9/54* (2006.01)
*G06F 9/455* (2018.01)

(52) U.S. Cl.
CPC .............. *G06F 9/541* (2013.01); *G06F 9/455* (2013.01)

(58) Field of Classification Search
CPC .. G06F 9/45558; G06F 9/4401; G06F 9/5077; G06F 2009/4557; G06F 2009/45575; G06F 2209/5021; G06F 9/45533; G06F 9/5005; G06F 9/5038; H04L 41/5003; H04L 41/0895; H04L 41/0897; H04L 41/40; H04L 43/20; H04L 41/0816; H04L 41/145; H04L 41/16; H04L 41/22; H04L 43/045; H04L 41/046; H04L 43/0876; H04L 41/5009

See application file for complete search history.

(56) References Cited

U.S. PATENT DOCUMENTS

| | | | |
|---|---|---|---|
| 10,061,850 B1* | 8/2018 | Kurzion | G06F 16/2453 |
| 10,971,162 B2* | 4/2021 | Liu | G10L 19/005 |
| 2008/0320341 A1* | 12/2008 | Shiono | G06F 16/972 |
| | | | 714/48 |
| 2012/0232868 A1* | 9/2012 | Ricketts | H04L 41/0896 |
| | | | 703/6 |
| 2019/0324831 A1* | 10/2019 | Gu | G06F 11/0775 |
| 2022/0318618 A1* | 10/2022 | Guntar | G06F 21/552 |

* cited by examiner

*Primary Examiner* — Jorge A Chu Joy-Davila

(57) ABSTRACT

One or more computing devices, systems, and/or methods for adaptive API call sequence detection are provided. A series of API calls and gap times between API calls of the series of API calls are recorded. The API calls are received and processed by a production system. The API calls are assigned into API call sequences. An end of an API call sequence is detected based upon a minimum response time and the gap times between the API calls. The API call sequences are utilized to simulate execution of the production system. A configuration is generated and applied to the production system based upon a result of the simulation.

20 Claims, 10 Drawing Sheets

ADAPTIVE API CALL SEQUENCE DETECTION

BACKGROUND

A production system may host software serving application programming interfaces (API) that service API calls from clients. For example, an email production system may host an email serving API that can provide email information in response to an email client requesting updated email information to provide to a user. In another example, a weather production system may host a weather service API that can provide weather information in response to a weather app client requesting current weather information to provide to a user. In this way, production systems may provide a wide variety of different services that receive and process API calls from clients.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
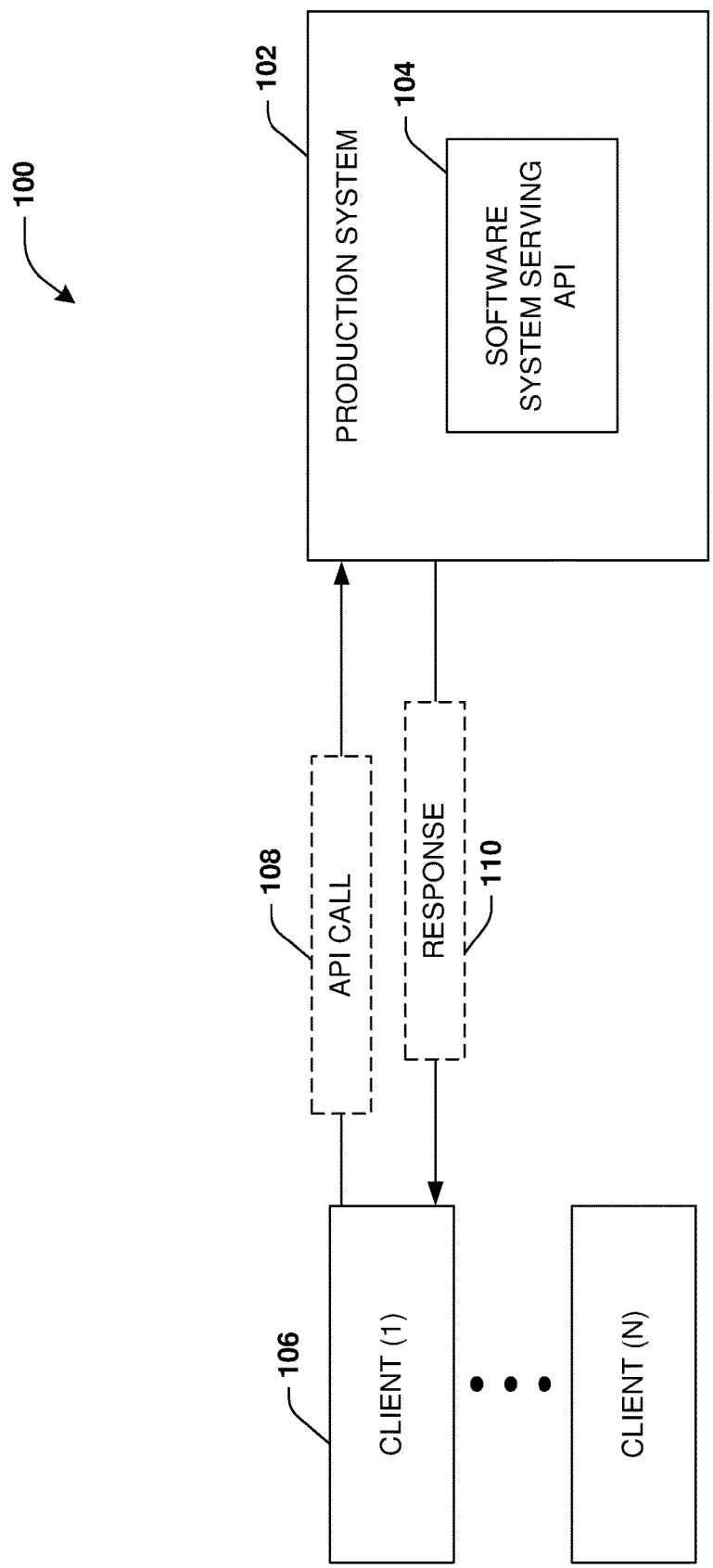
FIG. 1 is a diagram illustrating an example of a production system processing API calls.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for adaptive API call sequence detection are provided. A production system may provide various services to clients. The services may relate to email services, messaging services, call services, machine learning and artificial intelligence processing services, cloud storage services, application hosting services, services consumed by apps, and/or a wide variety of other types of services where the production system receives input as an API call and provides a response back to the API call. The production system may be hosted as a server, a container of a container orchestration platform (e.g., Kubernetes), a virtual machine, etc.

During initial deployment of the production system, the production system may not be optimally configured for efficiently processing API calls and/or for efficiently utilizing computing resources to process the API calls. This results in increases client latency and inefficient utilization of computing resources. In some instances, engineers may choose to simulate execution of the production system in order to monitor its performance. For example, simulations may be performed to determine how to reconfigure the production system for more efficiently processing API calls, more efficiently utilizing computing resources, performance tuning, debugging transient or intermittent issues, etc. Unfortunately, the simulation may lack adequate information and/or use imprecise models that cannot accurately simulate and test capacity of the production system, and thus the production system will be reconfigured in yet still a non-optimal manner. In particular, the simulation may take test API calls as input to a simulated production system. A series of API calls may include API calls whose response times (e.g., a time between the simulated production system receiving an API call and the simulated production system sending out a response) are affected by one or more other API calls within the series of API calls. The identification of which API calls affect other API calls cannot be accurately simulated and taken into account by conventional simulation systems, which may thus output inaccurate simulation results. Using these inaccurate simulation results to reconfigure the production system will result in the production system operating in a non-optimal manner.

Accordingly, as provided herein, adaptive API call sequence detection is performed to generate more precise and accurate API call sequences derived from a production system processing API calls. The API call sequences are constructed based upon response times of the API calls and gap times between each API call, and may also be constructed based upon minimum response time(s) and/or minimum gap time(s). The API call sequences can be used to simulate the production environment in order to obtain more accurate simulation results that more accurately reflect operation of the production environment. These simulation results can be used to reconfigure the production system in an optimal manner for more efficient API call processing (e.g., reducing client API call processing latency; avoiding bottlenecks; avoiding blocking operations), more efficient resource utilization, more precise debugging and identification of transient or intermittent issues, etc.

The techniques provided herein generate API call sequences with gap times between API calls that are received and processed by a production system. The API call sequences can either be generated in real-time during operation of the production system or offline after API call processing data has been collected by a probe, stored as records (entries) within a probe database. The records may include API sequence numbers, API options, API call arrival times, API response times, gaps between API call arrival times, or other API call processing data. The end of each API call sequence may be automatically detected based upon a minimum API response time (e.g., a shortest time from receiving an API call and the production system sending out a response to the API call, which will be shorter when there is little to no load) and gap times between sequentially received API calls. In particular, the length of gap times between consecutively received API calls can affect the response time of processing the API calls. If a gap time between receiving an API call and receiving a subsequent API call is too short, then the production system may not have enough time from processing the API call to being fully ready to process the subsequently received API call (e.g., additional time may be taken to clear memory, initialize data structure, load programming modules into memory, remove data structures associated with processing the API call, clear queues, etc.).

An API call sequence is constructed to include API calls that affected the response time of one or more other API calls within the API call sequence. For example, a first API call is received at a first point in time and a second API call is received at a second point in time subsequent the first point of time. The two API calls (e.g., a gap time between the two API calls, a response time of the second API call, minimum gap times and response times, etc.) are evaluated to determine whether the first API call and the second API call should be included within the same API call sequence or not. This determination is made based upon whether the processing of the first API call by the production system affects the response time for the second API call. If the gap time between receiving the first API call and receiving the second API call is too short, then the production system may not have enough time from processing the first API call to be fully ready to process the second API call. If the gap time is large enough between receiving the first API call and receiving the second API call, then the production system may be fully ready (e.g., under little to no load) to process the second API call such that processing the first API call will not affect processing of the second API call, and thus the API calls should not be grouped into the same API call sequence.

As will be described in further detail, the techniques provided herein can identify this minimum gap time and minimum response time, which are used with gap times and response times of API calls in order to determine how to group consecutive API calls into API call sequences. API calls that affect other API calls are grouped together into an API call sequence, otherwise, the API calls are grouped into different API call sequences.

Once the set of API call sequences are generated, the set of API call sequences may be used to simulate the production system within a simulation testing environment for capacity testing, debugging, performance tuning, reconfiguration of the production system for optimal performance (e.g., reduce client experienced latency for API call processing, more efficient memory and processor resource utilization during execution, etc.). In some embodiments, the API call sequences are used to generate a realistic load model used to reflected realistic conditions under which the production system processed API calls. The load model can be used to generate test API call sequences that can be fed into the simulation of the production system in order to generate results based on "real-world" call sequence information. The load model may be used to generate test API call sequences that include a longest API call sequence, a shortest API call sequence, a shortest gap time, an average API call sequence length with an average gap time, a medium API call sequence length with a median gap time, etc. In some embodiments, the generated API call sequences can be used as the test API call sequences such as by randomly picking or sampling API call sequences with actual record gap times.

The simulation results can be used to reconfigure the production system to improve the operation and efficiency of the production system (e.g., modify memory allocations, modify programming code modules, modify data structures, modify queue times, modify the number of threads or containers used for processing API calls, modify how responses are generated for API calls, modify processor resource allocations, etc.), which can also reduce client experienced latency experienced by clients sending API calls to the production system. The simulation results can also be used to debug issues experienced by the production system during operation, which greatly reduces the time and resources used to manually investigate such issues that can be intermittent due to unknown impacts on the call/response lifecycle of API calls.

FIG. 1 is a diagram illustrating an example of a system 100 that includes a production system 102 processing API calls. The production system 102 may be hosted as a server, a container of a container orchestration platform (e.g., Kubernetes), a virtual machine, or other hardware, software, or combination thereof. In some embodiments, the production system 102 may be hosted within a cloud computing environment or other computing environment accessible to clients over a network. The production system 102 may host a service (e.g., a voicemail service) that implements a software system serving API 104 that services and responds to API calls from clients (e.g., providing access to voicemail recordings in response to API calls requesting voicemail recording access). In some embodiments, a client 106 transmits an API call 108 over a network to the production system 102 for processing by the software system serving API 104 hosted by the production system 102. The API call 108 may have an API call arrival time at which the API call 108 is received by the production system 102.

The software system serving API 104 processes the API call 108 and generates a response 110 to the API call 108. A response time is the time between the API call 108 being received (the API call arrival time) and a time at which the response 110 is outputted by the production system 102. A gap time is the time from the API call 108 being received (the API call arrival time) and a subsequent/next API call being received by the production system 102 from a client (e.g., the client 106 or a different client).

If the production system 102 is under no load, then the response time for the API call 108 should be a minimum response time. If the production system 102 is under load (e.g., the production system 102 has not reset and settled from processing the API call 108 or is not fully ready to process the subsequent/next API call), then the response time for the subsequent/next API call may be longer than the minimum response time. That is, the production system 102 may need to reset such as by modifying or resetting resource allocations, modifying programming code modules, modify data structures, modify queue times, modify the number of threads or containers used for processing API calls, modify how responses are generated for API calls, etc. between servicing the API call 108 and servicing the subsequent/next API call. If the production system 102 has not finished processing the API call 108 and/or has not fully reset to be ready to process the subsequent/next API call, then the production system 102 will be under some load and/or may not be fully prepared to immediately process the subsequent/next API call. A minimum gap time is a shortest gap time between receiving the API call 108 and receiving the subsequent/next API call in order for the processing of the API call 108 to not affect processing of the subsequent/next API call (e.g., not increase the response time of the subsequent/next API call).

As will be described in further detail, the techniques provided herein can monitor an existing production system at various times to generate information accurately reflecting API call sequences processed by the existing production system so that this information can be used to generate test API call sequences feed into a simulated production system. The simulation results of simulating the production system 102 are used to modify operation of the production system 102 in order to improve the operation of the production system 102, reduce resource consumption by the production system 102, and/or reduce client experienced API call latency (e.g., a time span from sending the API call to a time at which the response 110 is received).

Figure 2:
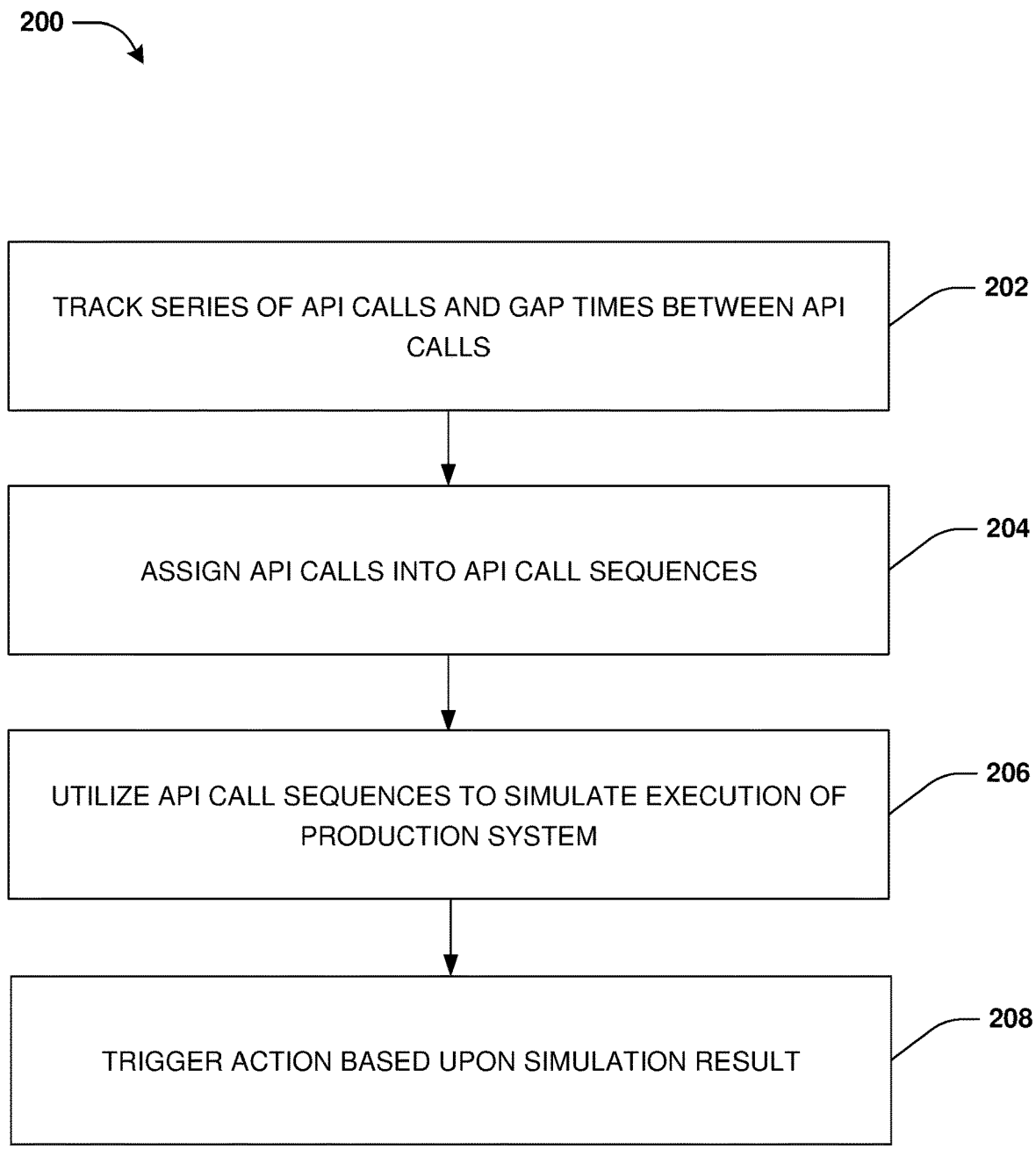
FIG. 2 is a flow chart illustrating an example method for adaptive API call sequence detection.

FIG. 2 is a flow chart illustrating an example method 200 for adaptive API call sequence detection. During operation 202 of method 200, a series of API calls and gap times between API calls of the series of API calls may be tracked. In some embodiments, each API call may be intercepted by a probe and processed (e.g., grouped into API call sequences) as the API calls are received and processed by a production system. In some embodiments, the API calls are intercepted by the probe and recorded within a probe database for subsequent (e.g., offline) processing after the production system has processed the API calls. In some embodiments, the probe is configured to intercept an API call, generate a record of the API call (e.g., record an arrival time of the API call, assign a sequence number to the API call, etc.), pass the API call to the production system to process, and then intercept and update the record based upon a response generated by the production system for the API call (e.g., update the record with a response time of the response, determine a gap time for a prior API call, etc.). As a next API call is received, the probe may generate a record for the next API call. This may also include recording a gap time between the API call and the next API call (e.g., a time difference between the arrival time of the API call and a next arrival time of the next API call). In some embodiments, the API calls are recorded into the probe database. A record for an API call may include an API sequence number assigned to the API call, an API option (e.g., HTTP options that describe communication options for a target of the API call), an arrival time of the API call, a response time of the API call, and a gap time between the API call and a direct prior API call.

During operation 204 of method 200, the API calls may be assigned into API call sequences. In some embodiments, the API calls are assigned into the API call sequences as the API calls are being received and processed by the production system, which is further illustrated and described in relation to FIG. 5. In some embodiments, the API calls are assigned into the API call sequences offline after the API calls have been processed by the production system, which is further illustrated and described in relation to FIG. 6. As part of assigning API calls into API call sequences, a minimum response time of response times for the API calls may be determined. The minimum response time corresponds to a shortest time of the production system receiving an API call and providing a response to the API call. Additionally, a minimum gap time of gap times between the API calls may be determined. The minimum gap time corresponds to a shortest time of the production system receiving an API call and receiving a subsequent API call. In some embodiments, the minimum gap time may be set as a gap time associated with an API call having the minimum response time. In some embodiments, a scaling factor may be applied to the minimum gap time. In some embodiments, a gap threshold is generated based upon applying the scaling factor to a minimum value of minimum gap times of the series of API calls.

The minimum response time and/or the minimum gap time (or gap threshold), along with response times and gap times of the API calls, are used to generate the API call sequences. Also, the minimum response time and/or gap times between API calls may be used to detect when to end one API call sequence and start a new API call sequence.

In some embodiments of grouping API calls into API call sequences, a first API call is grouped into a first API call sequence as a first record. A second API call (e.g., a next/subsequent API call) is evaluated (e.g., in real-time during operation of the production system or offline) to determine whether to group the second API call into the first API call sequence as a second record or create a second API call sequence and include the second record into the second API call sequence. If a gap time of the second API call (e.g., a gap time between the first API call and the second API call being received by the production system) is greater than or equal to the gap threshold, then the second API call sequence is created (and the first API call sequence is ended). In some embodiments, the gap threshold corresponds to a minimum gap time multiplied by a scaling factor such as 150% or any other scaling factor. This is because the gap time between receiving the first API call and receiving the second API call is large enough that the production system has time to be ready to process the second API call without additional delay (e.g., without increasing the response time for the second API). Thus, the second record of the second API call is included within the second API call sequence because the first API call of the first API call sequence does not influence the processing of the second API call (e.g., does not increase the response time for processing the second API call). Because the first API call does not influence the processing of the second API call, the second record of the second API call is not included within the first API call sequence that includes the first record of the first API call because the first API call sequence merely includes those API calls that affect response times of at least one other API call within the first API call sequence.

After, a third API call (e.g., a subsequent/next API call with respect to the second API call) is evaluated to determine whether a third record of the third API call is to be grouped into the second API call sequence, or a third API call sequence is to be created and the third record is to be grouped into the third API call sequence. In this way, API calls of the series of API calls may be processed.

If the gap time of the second API call is less than the gap threshold, then the processing of the first API call can affect the processing of the second API call (e.g., increasing the response time for the second API call because the production system does not have time, due to processing the first API call, to be fully ready to process the second API call when the second API call arrives). Accordingly, the second record of the second API call is grouped into first API call sequence because the processing of the first API call affects the processing of the second API call. After, the third API call is evaluated to determine whether the third record of the third API call is to be grouped into the first API call sequence, or the second API call sequence is to be created and the third record is to be grouped into the second API call sequence. In this way, API calls of the series of API calls may be processed.

In some embodiments of grouping API calls into API call sequences, the first API call is grouped into the first API call sequence as the first record. A determination is made as to whether to group the second API call into the first API call sequence as the second record, or to create the second API call sequence and group the second API call into the second API call sequence as the second record. If the response time of the second API call is smaller than or equal to the minimum response time (the minimum response time indicating a response time where an API call is not affected by a prior API call), then the second API call sequence is created and the second record of the second API call is included within the second API call sequence (and the first API call sequence is ended). This is because the response time of the second API call is short (smaller than or equal to the minimum response time), thus indicating that processing of the first API call does not affect the response time of the second API call. Because the processing of the first API call does not affect the response time of the second API call, the second API call is not included within the first API call sequence because the first API call sequence merely includes those API calls that affect response times of at least one other API call within the first API call sequence. If the response time of the second API call is smaller than or equal to the minimum response time, then the minimum gap time is set to the gap time of the second API call (e.g., the gap time of the second API call could be a new shortest gap time). The updated minimum gap time may be used to update the gap threshold. Additionally, the minimum response time may be set to the response time of the second API call (e.g., the response time of the second API call could be a new shortest response time).

Once the second API call is processed, a subsequent API call (e.g., a third API call) is evaluated to determine whether the subsequent API call is to be grouped into the second API call sequence or the subsequent API call sequence is to be grouped into a new API call sequence (e.g., a third API call sequence). In this way, API calls of the series of API calls may be processed.

If the response of the second API call is larger than the minimum response time, then the processing of the first API call affected (increased) the response time of the second API call being processed by the production system. Accordingly, the second record of the second API call is grouped into the first API call sequence with the first record of the first API call. After, the third API call is evaluated to determine whether the third record of the third API call is to be grouped into the first API call sequence, or the second API call sequence is to be created and the third record is to be grouped into the second API call sequence. In this way, API calls of the series of API calls may be processed.

During operation 206 of method 200, the API call sequences are used to simulate the execution of the production system as a simulated production system within a simulation environment. In some embodiments, the API call sequences and gap times of the API calls within the API call sequences are used to construct a load model. The load model is trained to generate test API call sequences representative of the actual API call sequences processed by the production system. The test API call sequences are applied to the simulation as input into the simulated production system in order to simulate how the production system would process the test API call sequences during real-time operation. In some embodiments, the load model generates a test API call sequence based upon at least one of a longest API call sequence, a shortest API call sequence, a shortest gap time, an average API call sequence length with an average gap time, and/or a median API call sequence length with a median gap time.

In some embodiments, the API call sequences are used to create the test API call sequences (e.g., with or without creating the load model). In some embodiments, a random selection algorithm may be executed to randomly select one or more API call sequences and/or gap times as the test API call sequences. In some embodiments, a sampling algorithm is executed to sample a threshold number of the API call sequences as the test API call sequences.

In this way, the simulation is performed in order to obtain a simulation result relating to the simulated production model processing the test API call sequences. The simulation result may track performance of the simulated production system. The simulation result may be used to identify issues or failures that occurred. The simulation result may be used to identify bottlenecks. The simulation results may be used to replicate and debug intermittent or transient issues. During operation 208 of method 200, an action may be triggered based upon the simulation result. The action may be executed to modify operation of the production system, which can improve the operation and performance of the production system (e.g., more efficiently utilize resources, reduce response times for processing API calls, reduce client experienced latency, etc.). In some embodiments, a configuration may be generated based upon the simulation result (e.g., a new allocation of memory or processor resources to allocate, a modification to a programming module, etc.). The configuration may be applied to the production system to modify the operation of the production system. A configuration command may be transmitted over a network to the production system to modify a configuration parameter of the production system.

In some embodiments, the simulation is executed to detect, through the simulation result, a problematic API call sequence based upon the simulation result indicating a deviation from a mean response (e.g., a response time deviating from the mean response by a threshold amount). A bottleneck with the production system may be identified as occurring when the production system is under load from the problematic API call sequence (e.g., blocking operations are occurring). In this way the production system may be reconfigured based upon the bottleneck.

In some embodiments, the simulation is performed to replay a scenario of API call sequences that were processed by the production system and resulted in an intermittent issue. In this way, the simulation result can be used to debug the intermittent issue because the simulation replayed the scenario of API call sequences that resulted in the intermittent issue that occurred during real-time operation of the production system. The production system may be reconfigured based upon a result of debugging the intermittent issue.

Figure 3:
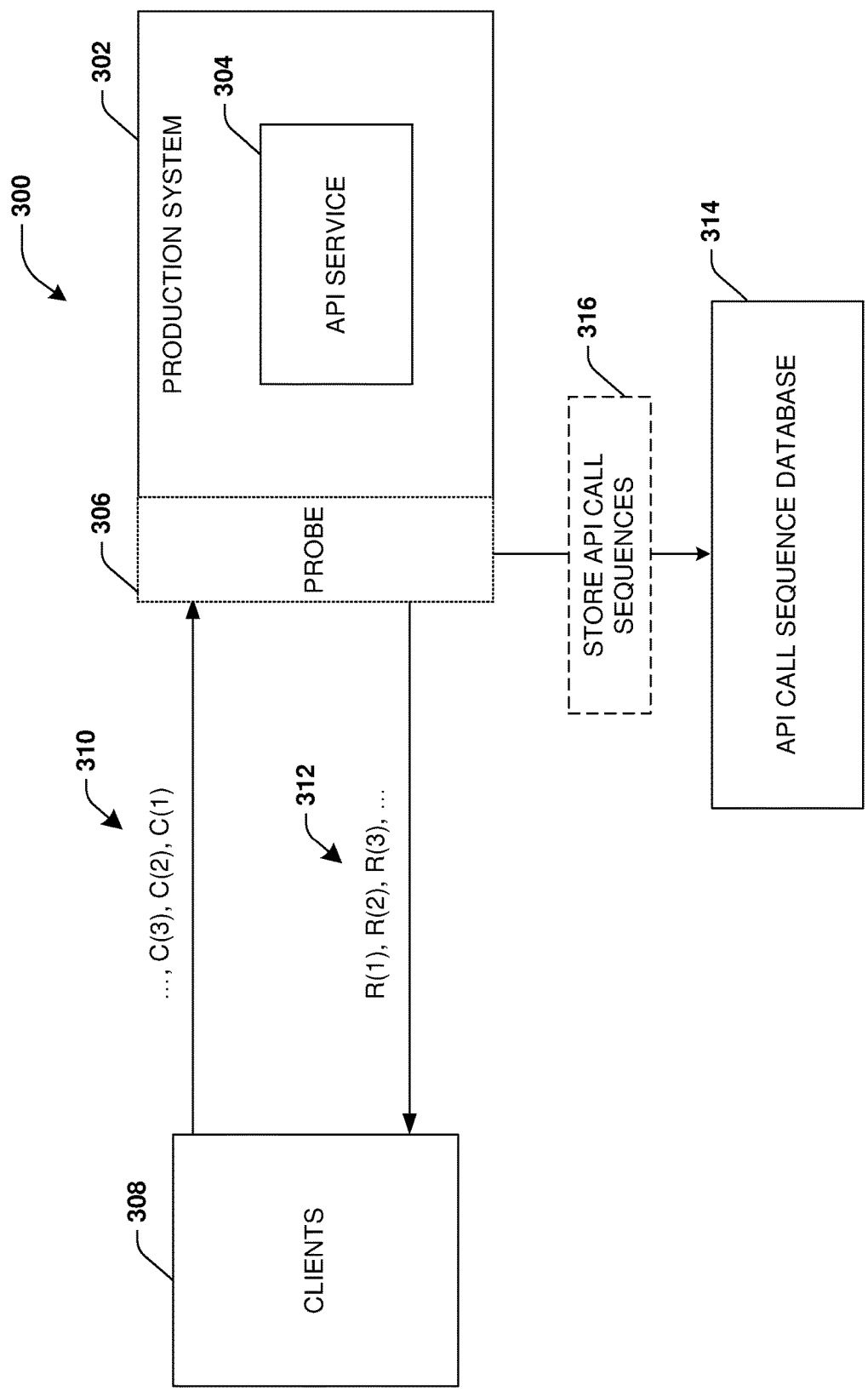
FIG. 3 is a diagram illustrating an example scenario associated with adaptive API call sequence detection.

FIG. 3 is a diagram illustrating an example scenario of a system 300 associated with adaptive API call sequence detection. A production system 302 is configured to process API calls 310 from clients 308 using an API service 304 of the production system 302. The API service 304 is configured to receive the API calls 310 from the clients, execute functionality based upon information within the API calls 310, and transmit responses 312 back to the clients based upon the execution of the functionality. In some embodiments, the API service 304 receives an API call C(1) and returns a response R(1), then receives an API call C(2) and returns a response R(2), then receives an API call C(3) and returns a response R(3), etc.

As part of implementing adaptive API call sequence detection, a probe 306 may be deployed for the production system 302. In some embodiments, the probe 306 may be implemented as a hardware module (e.g., network hardware), a software module, or combination thereof. The probe 306 is configured to record information related to the API calls 310, the responses 312, processing of the API calls 310, etc. In some embodiments, the probe 306 creates records of the API calls such as within a probe database. A record for an API call may include an API sequence number assigned to the API call, an API option (e.g., HTTP options that describe communication options for a target of the API call), an arrival time of the API call, a response time of the API call, and a gap time between the API call and a direct prior API call. The records may be created for subsequent offline processing. In some embodiments where real-time processing is performed, the probe 306 may create and store 316 API call sequences within an API call sequence database 314. The probe 306 includes consecutive API calls into the same API call sequence if gap times and/or response times of these API calls indicate that processing of the API calls affects at least one other API call within the API call sequence. Once the probe intercepts and detects an API call that does not affect or is not affected by the API calls within a current API call sequence, then a new API call sequence is created and the API call in grouped into the new API call sequence along with any other subsequent API calls that are affected by the API call or other API calls being grouped into the new API call sequence.

Figure 4A:
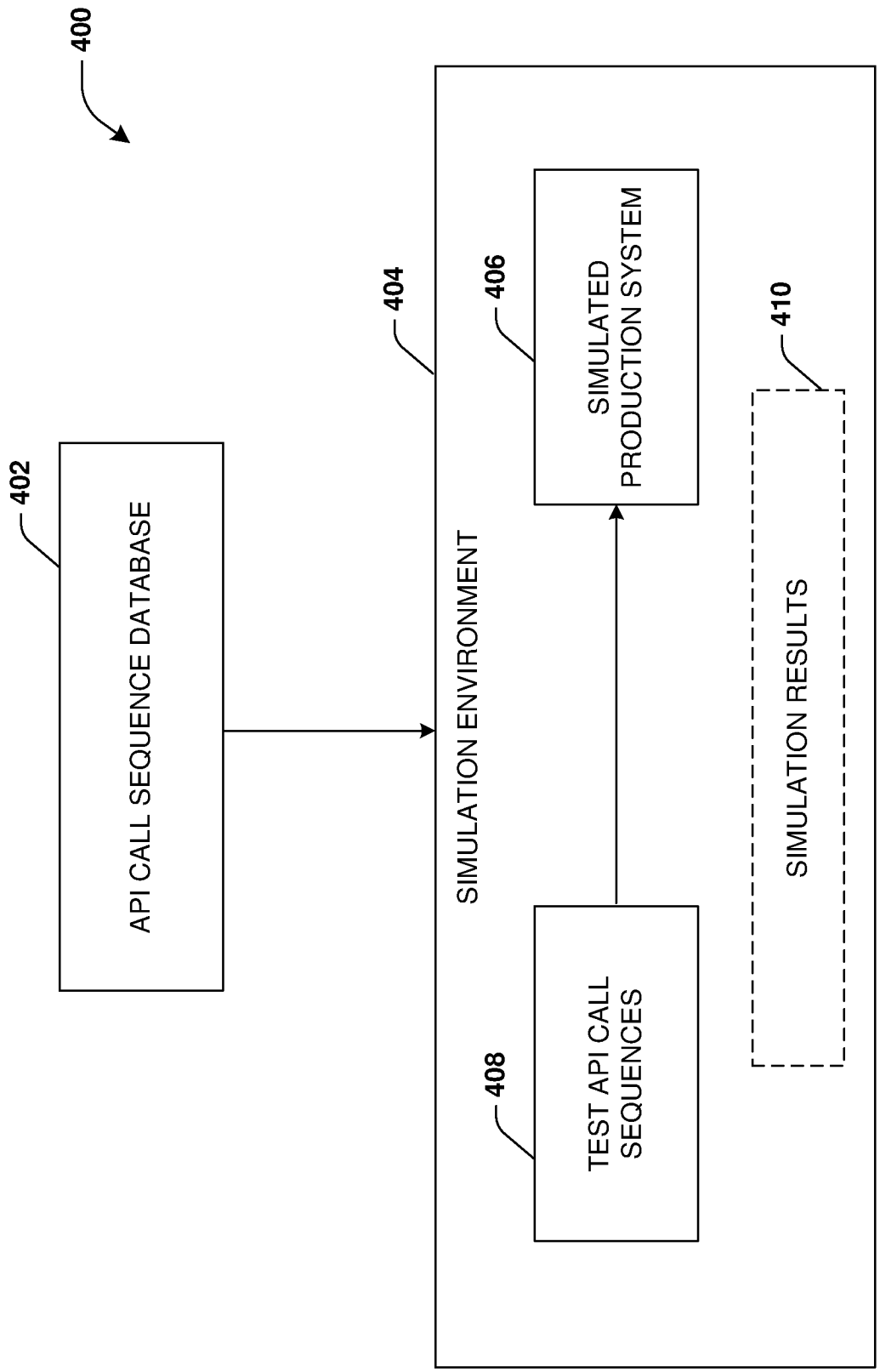
FIG. 4A is a diagram illustrating an example scenario associated with adaptive API call sequence detection, where a production platform is simulated.

FIG. 4A is a diagram illustrating an example scenario associated with adaptive API call sequence detection, where a simulation of a production platform is performed. A system 400 may be configured to simulate the production platform within a simulation environment 404. An API call sequence database 402 of API call sequences is used to generate test API call sequences 408. The test API call sequences 408 are input through the simulation environment 404 to a simulated production system 406 that is a simulation of the production platform. Simulation results 410 are generated from the simulation, which may be indicative of performance, bottlenecks, problematic API call sequences, failures, transient issues, or other information related to how the simulated production system 406 was able to process the test API call sequences 408.

Figure 4B:
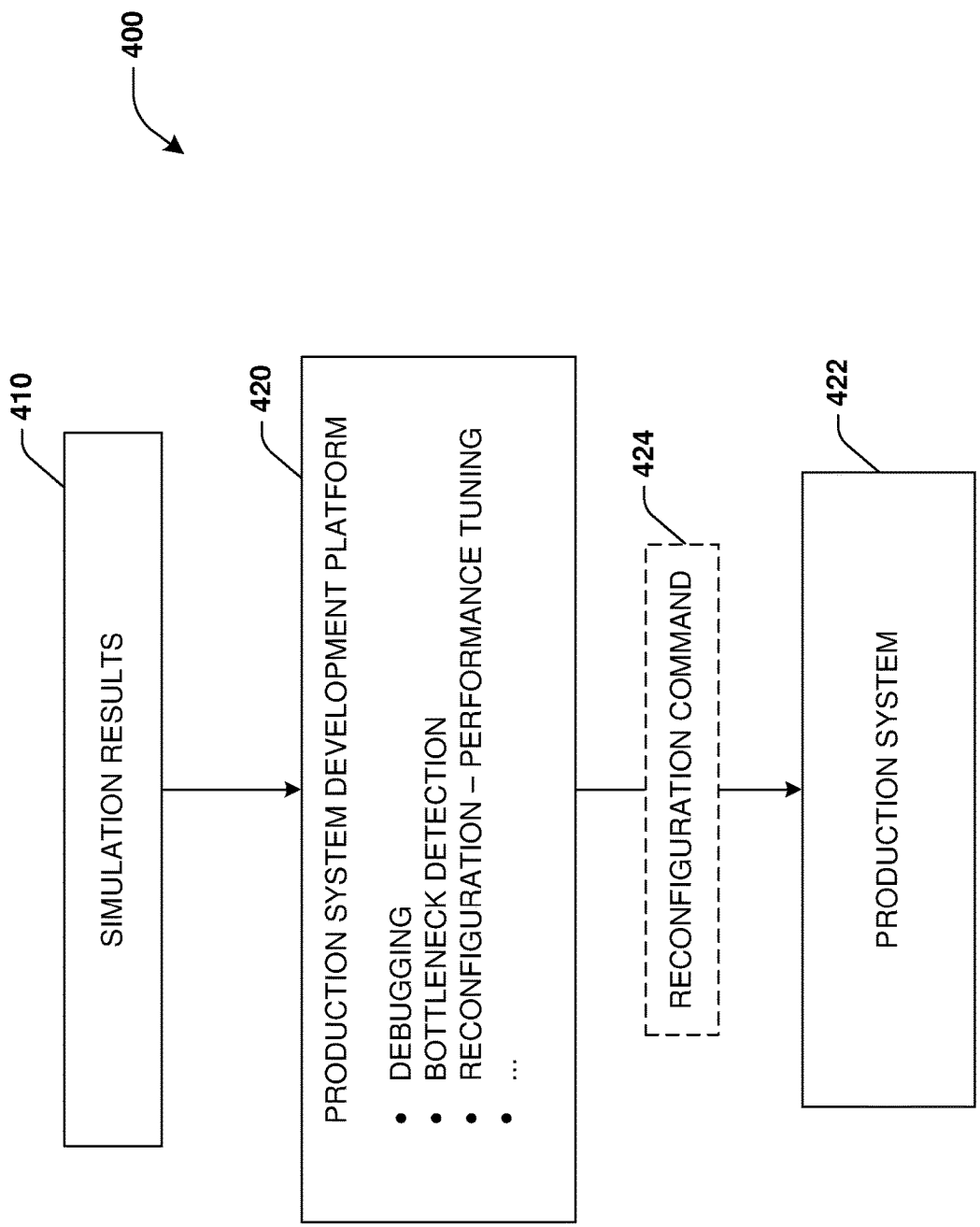
FIG. 4B is a diagram illustrating an example scenario associated with adaptive API call sequence detection, where a production system is reconfigured based upon simulation results of a simulation of the production system.

FIG. 4B is a diagram illustrating an example scenario associated with adaptive API call sequence detection, where a production system 422 is reconfigured based upon the simulation results 410 of the simulation of the production system 422. The simulation results 410 may be used by a production system development platform 420 to perform debugging, detect bottlenecks, determine how to reconfigure the production system 422 for performance tuning, etc. The production system development platform 420 may use the simulation results 410 to generate a reconfiguration command 424 that is transmitted by the production system development platform 420 over a network to the production system 422 to reconfigure the production system 422.

Figure 5:
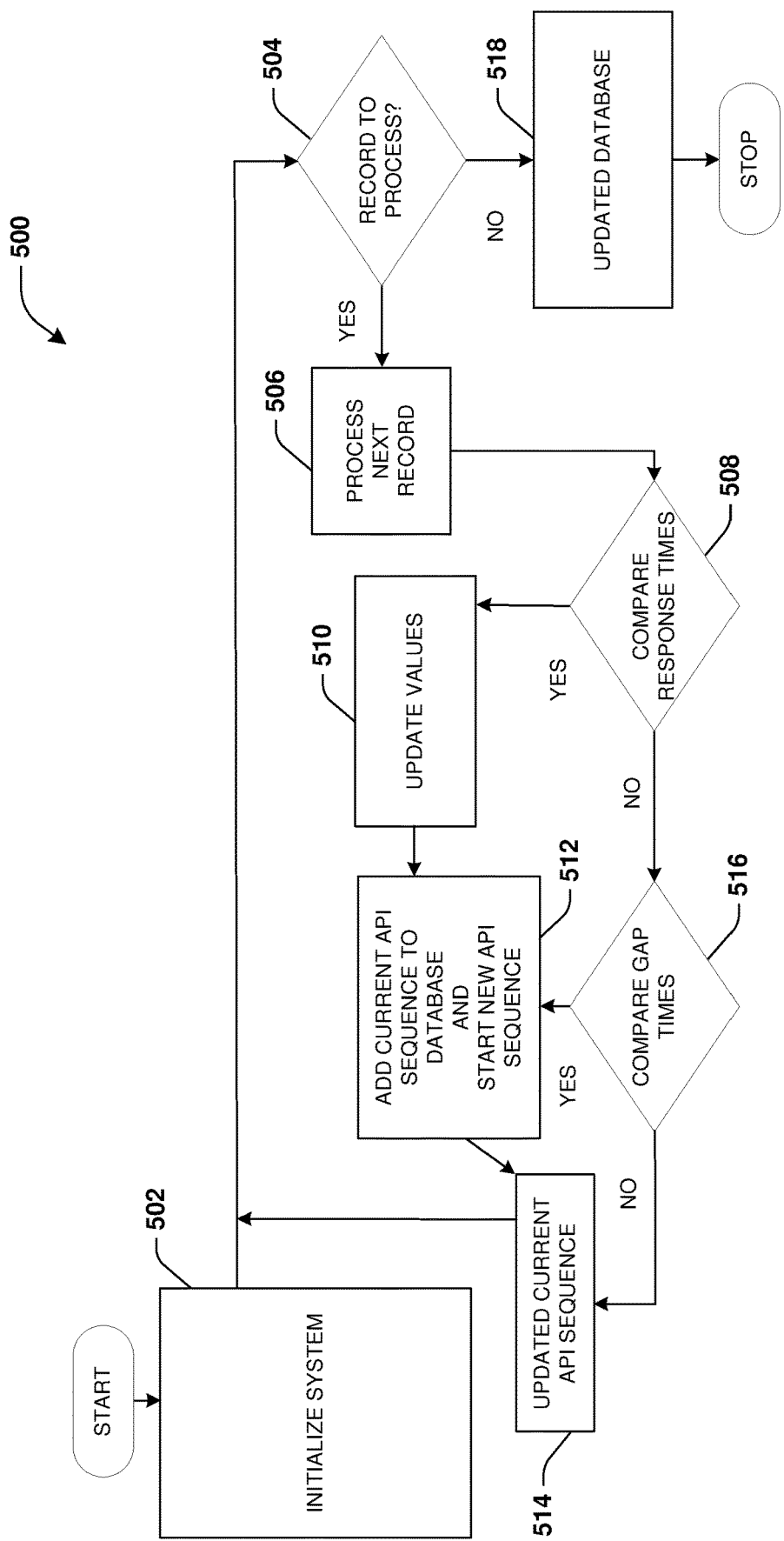
FIG. 5 is a flow chart illustrating an example method for adaptive API call sequence detection according to a batch mode.

FIG. 5 is a flow chart illustrating an example method 500 for adaptive API call sequence detection according to a batch mode. During operation 502 of method 500, for each API call option O(n), a smallest response time RT(n) in a probe database of records for API calls is found and a minimum gap time for the API call option Gmin(O(n)) is set to a smallest gap time G(n). A minimum response time for the API call option RTmin(O(n)) is set to the smallest response time RT(n) in the probe database. A scaling factor (e.g., 150% or some other value) is initialized. A gap threshold G(threshold) is set to the scaling threshold times the maximum of all G(min). An API call sequence number (CS) of 1 is initialized. An API sequence number (S1) and a gap time G(1) of a first API call is added into a first API call sequence (a sequence list). During operation 504 of method 500, a determination is made as to whether there are any more entries (records) within the probe database to process. If there are no more entries (records) to process, then a current API call sequence number (CS) and API call sequence is written to an API call sequence database, during operation 518.

If there are more entries (records) to process, then a next record in the probe database is evaluated, during operation 506 of method 500. During operation 508 of method 500, a determination is made as to whether a response time RT(n) of the next record is smaller than or equal to a current minimum response time for the API call option RTmin(O(n)). If the response time RT(n) is smaller than or equal to the current minimum response time for the API call operation RTmin(O(n)), then operation 510 of method 500 is performed. During operation 510 of method 500, the minimum gap time for the API call option Gmin(O(n)) is set to the gap time G(n) of the next record. Also, the minimum response time for the API call operation RTmin(O(n)) is set to the response time RT(n) of the next record. Additionally, the gap threshold G(threshold) is set to a scaling factor times the maximum of all G(min) that now also takes into account the gap time G(n) of the next record. After operation 510 has completed, operation 512 of method 500 is performed. During operation 512 of method 500, a current API call sequence number (S) and API call sequence (sequence list) is written to the API call sequence database. Additionally, a new API call sequence is created, and the API call sequence number (CS) is incremented by 1.

After operation 512 has completed, the current API call option O(n), the current API call sequence number S(n), and the current gap time G(n) are added to the current API call sequence, during operation 514 of method 500. After operation 514 has completed, operation 504 of method 500 is performed again to see if there are any other entries (records) to process.

Returning to operation 508 of method 500, if the response time RT(n) of the next record is not smaller than or equal to the current minimum response time for the API call operation RTmin(O(n)), then operation 516 of method 500 is performed. During operation 516 of method 500, a determination is made to as whether the current gap time G(n) is greater than or equal to the gap threshold G(threshold). If the current gap time G(n) is greater than or equal to the gap threshold G(threshold), then operation 512 of method 500 is performed. If the current gap time G(n) is not greater than or equal to the gap threshold G(threshold), then operation 514 of method 500 is performed. In this way, API call sequences are constructed offline after the probe has collected records, within the probe database, of the production system processing API calls.

Figure 6:
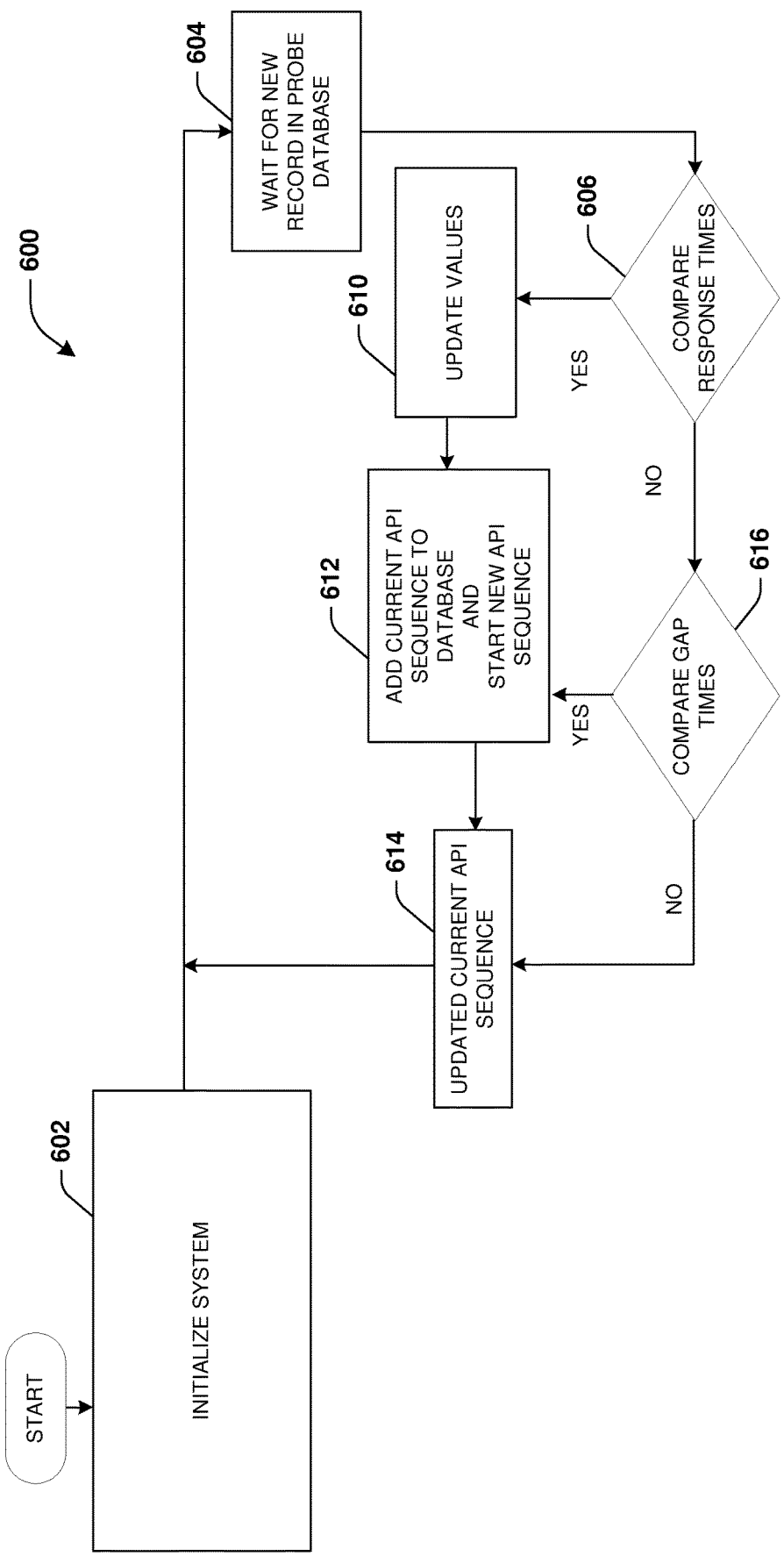
FIG. 6 is a flow chart illustrating an example method for adaptive API call sequence detection according to a real-time continuous mode.

FIG. 6 is a flow chart illustrating an example method 600 for adaptive API call sequence detection according to a real-time continuous mode where API call sequences are constructed during operation of a production system. During operation 602 of method 600, an all minimum response times for API call option RTmin(O(n)) is initialized with a constant value (e.g., 10 seconds). A minimum gap time for API call option Gmin(O(n)) is set to a constant value (e.g., 30 seconds). A scaling factor (e.g., 150% or some other value) is initialized. A gap threshold G(threshold) is set to the scaling threshold times the maximum of G(min). An API call sequence number (CS) of 1 is initialized. During operation 604, the method 600 waits for the probe to create a new record within a probe database based upon the probe intercepting an API call directed to the production system and the prober generating the record to track the production system processing the API call. The record may include various information such as an arrival time, a response time, a gap time, etc.

When a new record is created, the method 600 performs operation 606. During operation 606 of method 600, a determination is made as to whether a response time RT(n) of the new record is smaller than or equal to the current minimum response time for the API call option RTmin(O(n)). If the response time RT(n) is smaller than or equal to the current minimum response time for the API call operation RTmin(O(n)), then operation 610 of method 600 is performed. During operation 610 of method 600, the minimum gap time for the API call option Gmin(O(n)) is set to the gap time G(n) of the new record. Also, the minimum response time for the API call operation RTmin(O(n)) is set to the response time RT(n) of the new record. The gap threshold G(threshold) is set to a scaling factor (e.g., 150%) times the maximum of all G(min) that now also takes into account the gap time G(n) of the new record. After operation 610 has completed, operation 612 of method 600 is performed. During operation 612 of method 600, a current API call sequence number (S) and API call sequence (sequence list) is written to the API call sequence database. Additionally, a new API call sequence is created, and the API call sequence number (CS) is incremented by 1.

After operation 612 has completed, the current API call option O(n), the current API call sequence number (S), and the current gap time G(n) are added to the current API call sequence, during operation 614 of method 600. After operation 614 has completed, operation 604 of method 600 is performed again to see if a next new record has been populated within the probe database.

Returning to operation 606 of method 600, if the response time RT(n) of the next record is not smaller than or equal to the current minimum response time for the API call operation RTmin(O(n)), then operation 616 of method 600 is performed. During operation 616 of method 600, a determination is made to as whether the current gap time G(n) is greater than or equal to the gap threshold G(threshold). If the current gap time G(n) is greater than or equal to the gap threshold G(threshold), then operation 612 of method 600 is performed. If the current gap time G(n) is not greater than or equal to the gap threshold G(threshold), then operation 614 of method 600 is performed. In this way, API call sequences are constructed online in real-time during operation of the production system processing API calls.

According to some embodiments, a method may be provided. The method includes recording a series of API calls received from clients and processed by a production system; determining a minimum response time of response times for the series of API calls; determining a minimum gap time of gap times between API calls of the series of API calls; grouping sequential API calls of the series of API calls into API call sequences using the minimum response time and the minimum gap time; constructing a load model based upon the API call sequences and the gap times; utilizing the load model to simulate execution of the production system; and modifying operation of the production system based upon a result of the simulation.

According to some embodiments, determining the minimum gap time comprises: setting the minimum gap time as a gap time associated with an API call having the minimum response time.

According to some embodiments, determining the minimum gap time comprises: applying a scaling factor to the minimum gap time.

According to some embodiments, recording the series of API calls comprises: creating a record for an API call, wherein the record includes an API sequence number, an API option, an arrival time, a response time, and a gap time between the API call and a prior API call.

According to some embodiments, the method includes generating a gap threshold based upon a scaling factor applied to a maximum value of minimum gap times of the series of API calls.

According to some embodiments, grouping the sequential API calls comprises: including a first record, of a first API call, in a first API call sequence; and in response to a second record of a second API call being associated with a gap time greater than or equal to the gap threshold, creating a second API call sequence, otherwise, including the second record in the first API call sequence.

According to some embodiments, grouping the sequential API calls comprises: including a first record, of a first API call, into a first API call sequence; and in response to a second record of a second API call being associated with response time smaller than or equal to the minimum response time, creating a second API call sequence, otherwise, including the second record in the first API call sequence.

According to some embodiments, grouping the sequential API calls comprises: including a first record, of a first API call, in a first API call sequence; and in response to a second record of a second API call being associated with response time smaller than or equal to the minimum response time: setting the minimum gap time to a gap time of the second API call; setting the minimum response time to the response time of the second API call; and updating the gap threshold by applying the scaling factor to a current maximum value of the minimum gap times of the series of API calls.

According to some embodiments, modifying operation of the production system comprises: transmitting a configuration command over a network to the production system to modify a configuration parameter of the production system.

According to some embodiments, utilizing the load model to simulate execution of the production system comprises: generating a test API call sequence using the load model; and applying the test API call sequence to the simulation of the execution of the production system.

According to some embodiments, the test API call sequence corresponds to at least one of a longest API call sequence, a shortest API call sequence, a shortest gap time, an average API call sequence length with an average gap time, or a median API call sequence length with a median gap time.

According to some embodiments, the method includes evaluating the simulation of the execution of the production system to detect a problematic API call sequence based upon a deviation from a mean response; identifying a bottleneck with the production system that occurs while the production system is under load from the problematic API call sequence; and reconfiguring the production system based upon the bottleneck.

According to some embodiments, the method includes performing the simulation to debug an intermittent issue with the production system, wherein the simulation replays a scenario where the intermittent issue occurred.

According to some embodiments, a non-transitory computer-readable medium storing instructions that when executed facilitate performance of operations, is provided. The operations include recording a series of API calls and gap times between API calls of the series of API calls, wherein the API calls are received and processed by a production system; assigning the API calls into API call sequences, wherein an end of an API call sequence is detected based upon a minimum response time and the gap times between the API calls; utilizing the API call sequences to simulate execution of the production system; and generating a configuration to apply to the production system based upon a result of the simulation.

According to some embodiments, the operations include generating test API call sequences based upon the API call sequences; and utilizing the test API call sequences to simulate the execution of the production system.

According to some embodiments, generating test API call sequences comprises: executing a random selection algorithm to randomly select one or more API call sequences and gap times as the test API call sequences.

According to some embodiments, generating test API call sequences comprises: executing a sampling algorithm to sample a threshold number of the API call sequences as the test API call sequences.

According to some embodiments, a computing device is provided. The computing device comprises memory storing instructions; and one or more processors configured for executing the instructions to perform operations comprising tracking a series of API calls and gap times between API calls of the series of API calls as the API calls are received and processed by a production system; assigning the API calls into API call sequences, wherein an end of an API call sequence is detected based upon a minimum response time and the gap times between the API calls; utilizing the API call sequences to simulate execution of the production system; and evaluating a result of the simulation to debug an issue with the production system.

According to some embodiments, the operations include reconfiguring the production system based upon a debug result of debugging the issue.

According to some embodiments, the production system comprises at least one of a container hosted by a container orchestration platform, a virtual machine, or a service.

Figure 7:
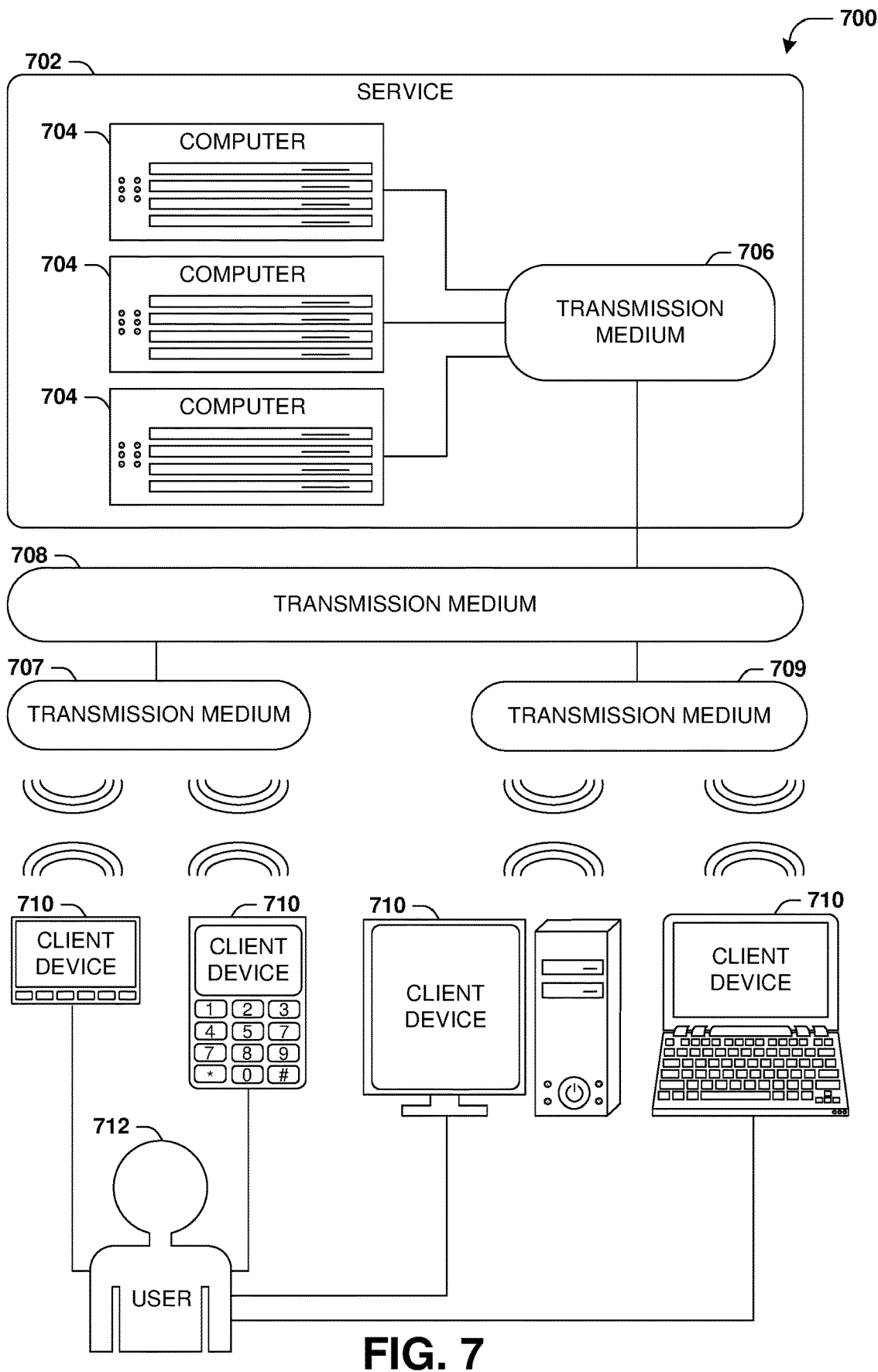
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
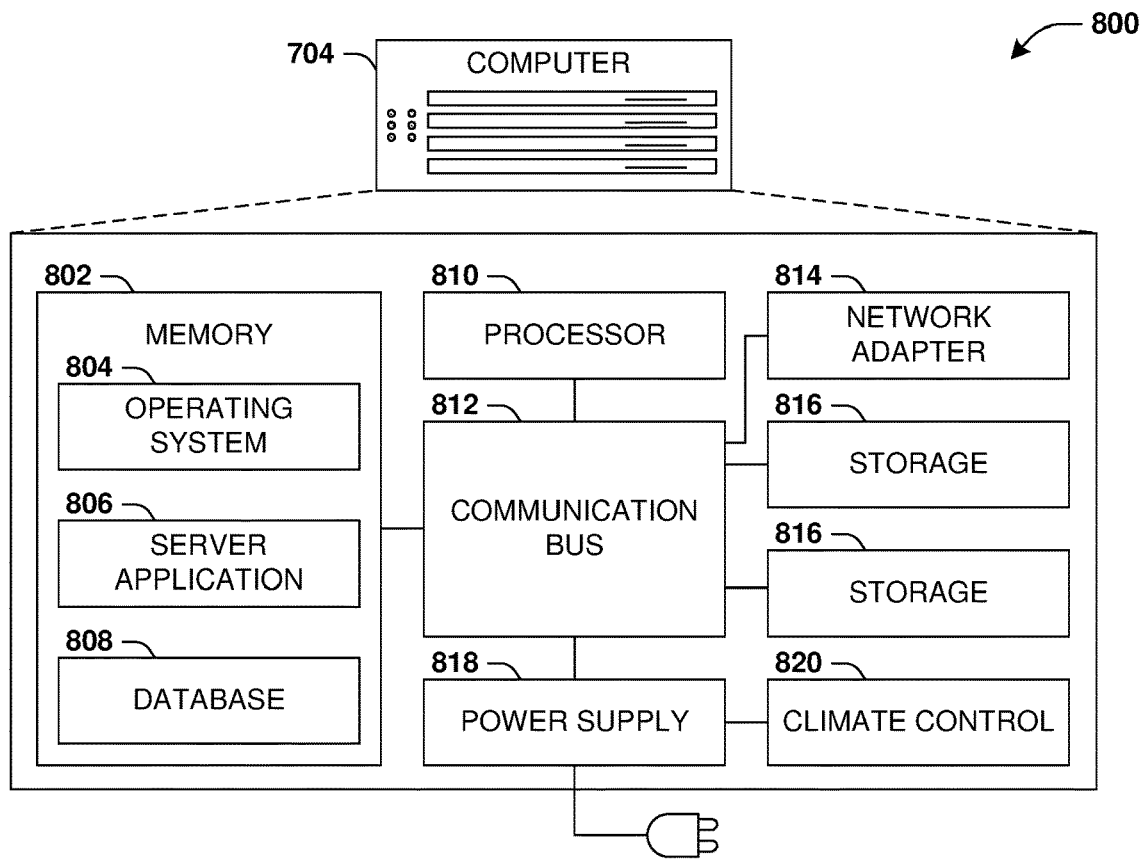
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
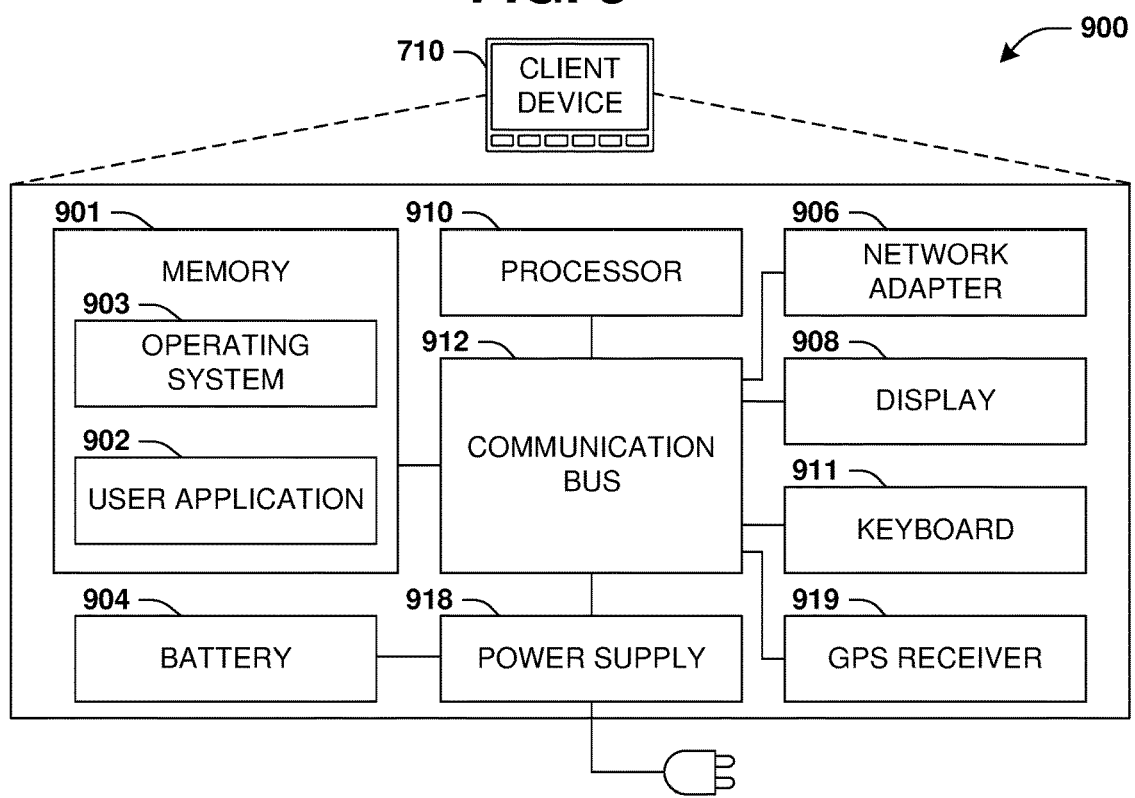
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

Figure 10:
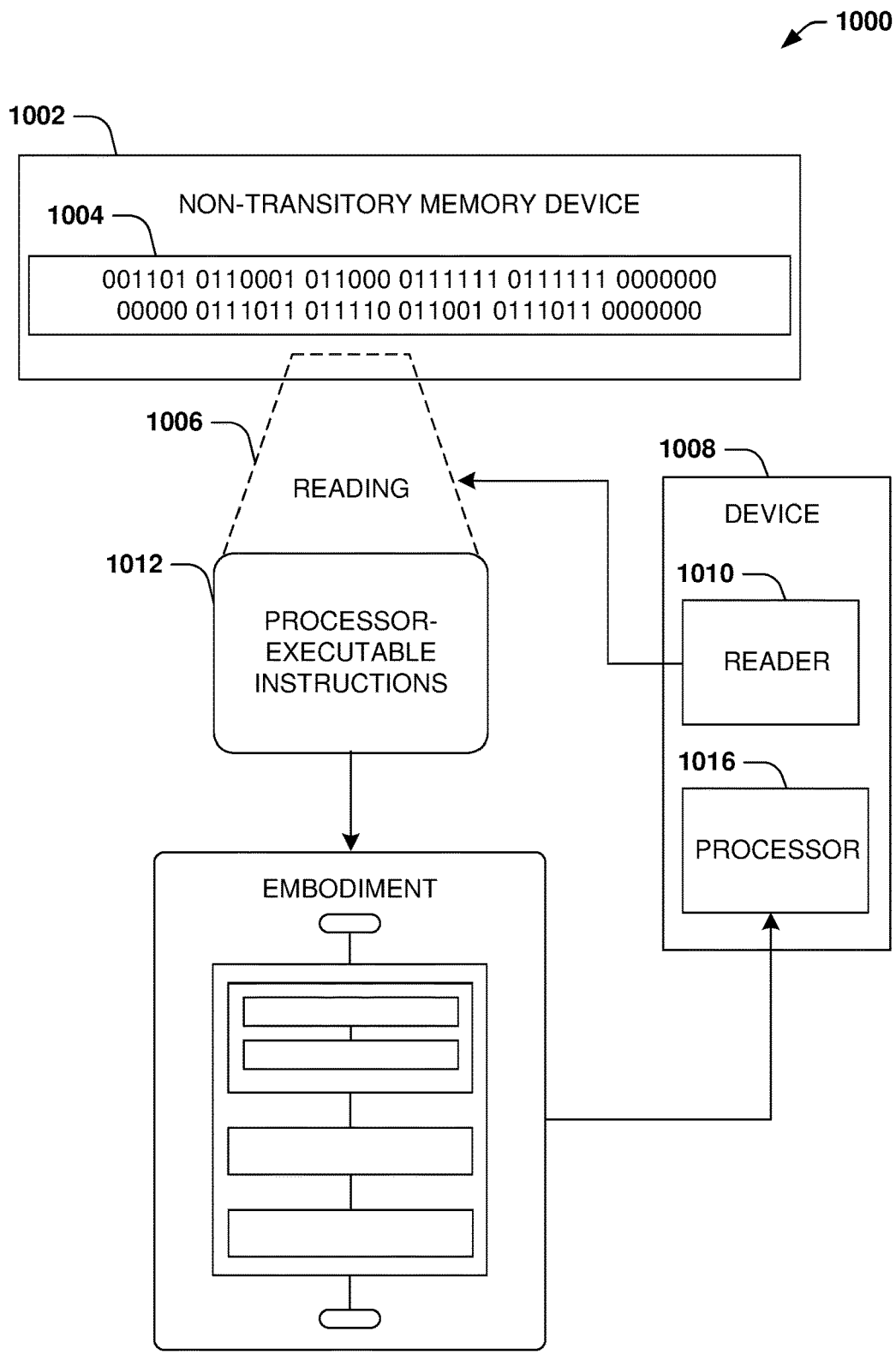
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 200 of FIG. 2, at least some of the example method 500 of FIG. 5, at least some of the example method 600 of FIG. 6, for example. In some embodiments, the processor-executable instructions 1012 are configured to cause implementation of a system, such as at least some of the example system 300 of FIG. 3 and/or at least some of the example system 400 of FIGS. 4A and 4B.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:
    recording a series of API calls received from clients and processed by a production system;
    determining a minimum response time of response times for the series of API calls;
    determining a minimum gap time of gap times between API calls of the series of API calls;
    grouping sequential API calls of the series of API calls into API call sequences based on the minimum response time and the minimum gap time;
    constructing a load model based upon the API call sequences and the gap times;
    utilizing the load model to simulate execution of the production system; and
    modifying operation of the production system based upon a result of the simulation.

2. The method of claim 1, wherein determining the minimum gap time comprises:
    setting the minimum gap time as a gap time associated with an API call having the minimum response time.

3. The method of claim 1, wherein determining the minimum gap time comprises:
    applying a scaling factor to the minimum gap time.

4. The method of claim 1, wherein recording the series of API calls comprises:
    creating a record for an API call, wherein the record includes an API sequence number, an API option, an arrival time, a response time, and a gap time between the API call and a prior API call.

5. The method of claim 1, comprising:
    generating a gap threshold based upon a scaling factor applied to a maximum value of minimum gap times of the series of API calls.

6. The method of claim 5, wherein grouping the sequential API calls comprises:
    including a first record, of a first API call, in a first API call sequence; and
    in response to a second record of a second API call being associated with a gap time greater than or equal to the gap threshold, creating a second API call sequence, otherwise, including the second record in the first API call sequence.

7. The method of claim 5, wherein grouping the sequential API calls comprises:
including a first record, of a first API call, into a first API call sequence; and
in response to a second record of a second API call being associated with response time smaller than or equal to the minimum response time, creating a second API call sequence, otherwise, including the second record in the first API call sequence.

8. The method of claim 5, wherein grouping the sequential API calls comprises:
including a first record, of a first API call, in a first API call sequence; and
in response to a second record of a second API call being associated with response time smaller than or equal to the minimum response time:
setting the minimum gap time to a gap time of the second API call;
setting the minimum response time to the response time of the second API call; and
updating the gap threshold by applying the scaling factor to a current maximum value of the minimum gap times of the series of API calls.

9. The method of claim 1, wherein modifying operation of the production system comprises:
transmitting a configuration command over a network to the production system to modify a configuration parameter of the production system.

10. The method of claim 1, wherein utilizing the load model to simulate execution of the production system comprises:
generating a test API call sequence using the load model; and
applying the test API call sequence to the simulation of the execution of the production system.

11. The method of claim 10, wherein the test API call sequence corresponds to at least one of a longest API call sequence, a shortest API call sequence, a shortest gap time, an average API call sequence length with an average gap time, or a median API call sequence length with a median gap time.

12. The method of claim 1, comprising:
evaluating the simulation of the execution of the production system to detect a problematic API call sequence based upon a deviation from a mean response;
identifying a bottleneck with the production system that occurs while the production system is under load from the problematic API call sequence; and
reconfiguring the production system based upon the bottleneck.

13. The method of claim 1, comprising:
performing the simulation to debug an intermittent issue with the production system, wherein the simulation replays a scenario where the intermittent issue occurred.

14. A non-transitory computer-readable medium storing instructions that when executed facilitate performance of operations comprising:
recording a series of API calls and gap times between API calls of the series of API calls, wherein the API calls are received and processed by a production system;
assigning the API calls into API call sequences, wherein an end of an API call sequence is detected based upon a minimum response time and a minimum gap time of the gap times between the API calls;
utilizing the API call sequences to simulate execution of the production system;
generating a configuration based upon a result of the simulation; and
transmitting a configuration command, of the configuration, to modify a configuration parameter of the production system.

15. The non-transitory computer-readable medium of claim 14, wherein the operations comprise:
generating test API call sequences based upon the API call sequences; and
utilizing the test API call sequences to simulate the execution of the production system.

16. The non-transitory computer-readable medium of claim 15, wherein generating test API call sequences comprises:
executing a random selection algorithm to randomly select one or more API call sequences and gap times as the test API call sequences.

17. The non-transitory computer-readable medium of claim 15, wherein generating test API call sequences comprises:
executing a sampling algorithm to sample a threshold number of the API call sequences as the test API call sequences.

18. A computing device comprising:
one or more processors configured for executing the instructions to perform operations comprising:
tracking a series of API calls and gap times between API calls of the series of API calls as the API calls are received and processed by a production system;
assigning the API calls into API call sequences, wherein an end of an API call sequence is detected based upon a minimum response time and a minimum gap time of the gap times between the API calls;
utilizing the API call sequences to simulate execution of the production system; and
evaluating a result of the simulation; and
reconfiguring the production system based upon the evaluation of the result.

19. The computing device of claim 18, wherein the operations comprise:
debugging an issue with the production system, wherein reconfiguring the production system is based upon a debug result of debugging the issue.

20. The computing device of claim 18, wherein the production system comprises at least one of a container hosted by a container orchestration platform, a virtual machine, or a service.

* * * * *